United States Patent
Romano

(10) Patent No.: US 9,762,404 B2
(45) Date of Patent: Sep. 12, 2017

(54) PROVIDING CONTEXTUAL INFORMATION ASSOCIATED WITH A COMMUNICATION PARTICIPANT

(75) Inventor: Anthony C. Romano, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 865 days.

(21) Appl. No.: 13/350,812

(22) Filed: Jan. 15, 2012

(65) Prior Publication Data
US 2013/0185347 A1    Jul. 18, 2013

(51) Int. Cl.
| | |
|---|---|
| G06F 15/16 | (2006.01) |
| G06F 3/00 | (2006.01) |
| G06K 7/00 | (2006.01) |
| H04L 12/18 | (2006.01) |
| G06F 21/62 | (2013.01) |
| H04L 12/58 | (2006.01) |

(52) U.S. Cl.
CPC ...... H04L 12/1818 (2013.01); G06F 21/6218 (2013.01); H04L 51/36 (2013.01)

(58) Field of Classification Search
CPC ......... G06F 17/30115; G06F 17/30268; G06F 19/322; G06F 21/316; G06F 21/6272; G06F 17/3012; G06F 17/30179; H04L 67/06; H04L 67/104; H04L 51/14; G06Q 50/01; H04M 2203/2038; G06N 5/02; Y10S 707/99956; G06K 9/726
USPC .......................... 370/352; 707/812; 709/203
See application file for complete search history.

(56) References Cited

U.S. PATENT DOCUMENTS

| | | | | |
|---|---|---|---|---|
| 5,634,051 A | * | 5/1997 | Thomson | ........... G06F 17/30613 |
| 5,873,085 A | * | 2/1999 | Enoki et al. | |
| 6,226,669 B1 | * | 5/2001 | Huang et al. | ................. 709/204 |
| 6,968,332 B1 | * | 11/2005 | Milic-Frayling | . G06F 17/30867 707/723 |
| 7,117,243 B2 | * | 10/2006 | Peart | ....................... G06F 9/547 345/1.1 |

(Continued)

OTHER PUBLICATIONS

"International Search Report", Mailed Date: Apr. 19, 2013, Application No. PCT/US2013/020719, Filed Date: Jan. 9, 2013, pp. 11.

(Continued)

*Primary Examiner* — Bryan Lee
*Assistant Examiner* — Margishi Desai
(74) *Attorney, Agent, or Firm* — Talem IP Law, LLP

(57) ABSTRACT

Contextual information associated with a party in a communication instance is provided to a user upon request. The communication instance can comprise a voice call, email, or video conference. If there is more than one party associated with the communication instance, the user may select the participating party from among several participating parties. The user may indicate the type of contextual information to be searched. The types of contextual information may include documents, spreadsheets, presentations, call records, emails, or other information associated with the selected participant. Contextual information search results comprising a list of file names of the selected file type are provided to the user. The user may further select a specific file name and, in response, view a thumbnail image of the file. A list of potential contextual information sources may be defined for each user.

20 Claims, 7 Drawing Sheets

(56) References Cited

U.S. PATENT DOCUMENTS

| | | | |
|---|---|---|---|
| 8,275,108 B2* | 9/2012 | O'Sullivan et al. | 379/202.01 |
| 2005/0283394 A1* | 12/2005 | McGloin et al. | 705/10 |
| 2006/0171380 A1* | 8/2006 | Chia | 370/352 |
| 2007/0071187 A1* | 3/2007 | Apreutesei et al. | 379/93.01 |
| 2008/0243999 A1* | 10/2008 | Pazhyannur et al. | 709/203 |
| 2009/0193038 A1* | 7/2009 | Butt | 707/100 |
| 2010/0017366 A1* | 1/2010 | Robertson | G06F 17/30867 |
| 2010/0030578 A1* | 2/2010 | Siddique | G06Q 10/0637 705/3 |
| 2010/0077029 A1* | 3/2010 | Shook et al. | 709/204 |
| 2010/0131574 A1* | 5/2010 | Reese | G06F 3/0481 707/812 |
| 2010/0145927 A1* | 6/2010 | Kasbekar | G06F 17/30867 707/710 |
| 2010/0246570 A1* | 9/2010 | Chavez et al. | 370/352 |
| 2010/0312836 A1* | 12/2010 | Serr et al. | 709/206 |
| 2011/0043601 A1* | 2/2011 | Dye et al. | 348/14.09 |
| 2011/0107434 A1* | 5/2011 | Chow et al. | 726/28 |
| 2011/0154208 A1* | 6/2011 | Horii | 715/736 |
| 2011/0212430 A1* | 9/2011 | Smithmier | G09B 5/06 434/322 |
| 2011/0239135 A1* | 9/2011 | Spataro et al. | 715/753 |
| 2011/0252093 A1* | 10/2011 | Spataro et al. | 709/204 |
| 2011/0258550 A1* | 10/2011 | Dinh-Trong et al. | 715/736 |
| 2012/0143734 A1* | 6/2012 | Pekerman | 705/32 |
| 2012/0173612 A1* | 7/2012 | Vegesna-Venkata et al. | 709/203 |
| 2012/0323938 A1* | 12/2012 | Skeen | G06F 17/30752 707/754 |

OTHER PUBLICATIONS

Peters, Kevin, "Lync Client Conversation Translator", Retrieved at <<http://ocsguy.com/2011/02/17/lync-client-conversation-translator/>>, Feb. 17, 2011, pp. 7.

Chai, et al., "Mind: A Context-Based Multimodal Interpretation Framework in Conversational Systems", Retrieved at <<http://citeseerx.ist.psu.edu/viewdoc/download?doi=10.1.1.134.5829&rep=rep1&type=pdf>>, Natural, Intelligent and Effective Interaction in Multimodal Dialogue Systems, 2003, pp. 1-21.

George, et al., "Building Communications Solutions with Microsoft Lync Server 2010", Retrieved at <<http://media.wiley.com/product_data/excerpt/36/04709390/0470939036-58.pdf>>, Professional Unified Communications Development with Microsoft Lync Server, May 2011, pp. 1-9.

* cited by examiner

PROVIDING CONTEXTUAL INFORMATION ASSOCIATED WITH A COMMUNICATION PARTICIPANT

BACKGROUND

Communication in the enterprise environment is increasingly becoming more sophisticated and frequently involves more than one communication media. Direct communication in an enterprise context, whether it is accomplished for example via telephone or email, is often in regard to the parties discussing and referencing another form of communication between the parties. For example, two persons may collaborate in a telephone call to edit a section of a document that has been previously communicated between the parties. Or, one person may call the other to discuss the contents of an earlier sent or received email. Other communications instances may involve multiple party communications, such as a telephone conference call, that may involve a leader presenting a slide presentation to the other participants.

Communications between parties may be initiated in one form, such as email, and after a further exchange, be continued at a subsequent date in another form, using voice or video conferencing. The parties may further communicate on the same topic with a large number of other parties at different times. One party may also communicate with the same party on a large number of different matters. Thus, in an enterprise environment, an individual may be involved in a variety of communications media, with a variety of parties, and for a variety of matters.

In many instances, one party to a given instance of communication may seek to establish a context for the communication instance. For example, communications between two parties may have been initiated by email and may resume at a later time using voice communication to allow a more interactive communication about the same topic. Although both parties may recall the prior communication and the topic thereof, the party receiving an incoming call may find it beneficial to quickly establish a context of the incoming voice call by accessing relevant information. It would be more efficient if the recipient of the communication could quickly review the prior forms of communication with the other party to quickly establish a context for the instant communication.

It is with respect to these and other considerations that the disclosure made herein is presented.

SUMMARY

Concepts and technologies are described herein for providing contextual information to a user involved in an instance of communication with another party. The contextual information may include information about prior communications between the parties, documents authored by one or the other party, or other types of information associated with the communication instance in some way. A user may be able to quickly identify the type of contextual information requested, and indicate the other party to be associated with the contextual information.

In one embodiment, a computer implemented method for providing contextual information for a communication instance includes establishing the communication instance of a first type by a server between a user computing device executing a client application and at least one remote communication device, wherein the communication instance involves conveying information using an Internet based protocol between the client application and the server. The server determines an identity of a party associated with the remote communication device by using a communication identifier associated with the communication instance. The server also determines a name of the party using the communication identifier.

The server also determines there are at least two file types where each includes at least one file, wherein each file is each associated with the party and available from one or more servers. The server then provides to the client application the name of the party and the at least two file types.

The server then receives a request at the server from the client application selecting one of the at least two different file types, wherein the request is associated with the identity of the party. The server then provides to the client application search results of contextual information associated with the identity of the party. The contextual information includes a file name of the at least one file associated with the selected file type.

In another embodiment, a server provides contextual information and includes a communication interface for conveying an Internet Protocol ("IP") based communication instance between a client application executing in a user computing device and a remote communication device associated with a party. The server includes a memory for storing a name of the party and contextual information associated with the party.

The server includes a processor configured to establish the IP based communication instance of a first type between the client and the party, determine the name associated with the party using a communication instance identifier associated with the party, and determine at least two file types each associated with at least one file associated with the party. The processor is further configured to receive a request from the client application indicating a selected file type, wherein the selected file type is selected from the at least two file types, and wherein the request is associated with the name of the party. The processor is further configured to provide by the server to the client application one or more contextual image file names having the selected file type, and provide by the server to the client application a thumbnail image of a selected one of the one or more contextual image file names having the selected file type.

In another embodiment, a computer readable medium store instructions thereon when executed cause the processor to determine a name of a party associated with a communication instance based on a communication identifier associated with the party involved in the communication instance. The instructions cause the processor to determine at least two contextual information file types, each associated with at least one file further associated with the party and provide the at least two contextual information file types to a client application.

The instructions further cause the processor receive a request from the client application indicating a selected contextual information file type that is selected from at least two contextual information file types. The request is further associated with the party. The instructions further cause the processor to provide one or more contextual information file names of the selected contextual information file type to the client application, and provide to the client application a thumbnail image of a selected contextual image file name having the selected file type.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
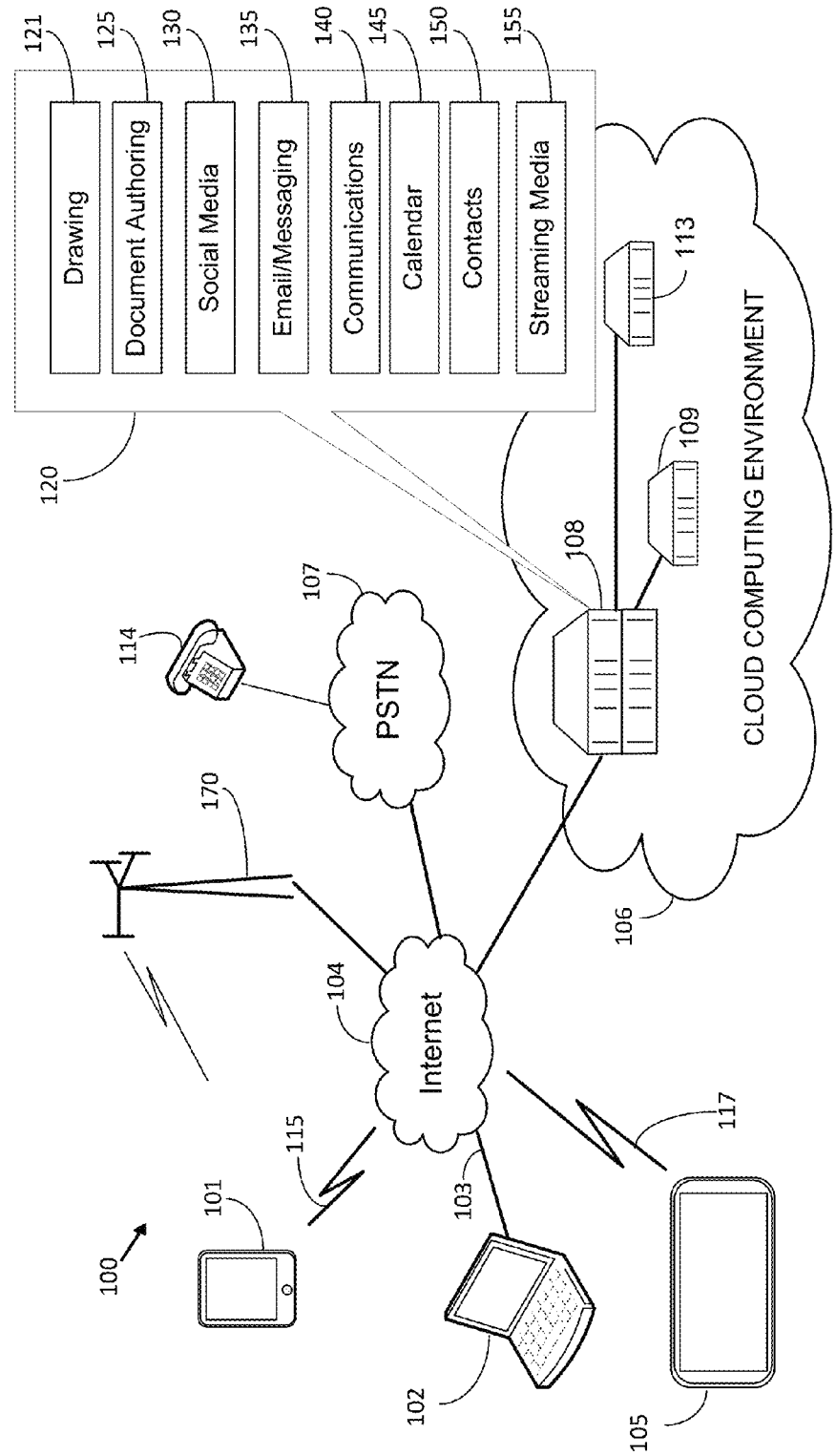
FIG. 1 is an illustration of one environment of a user receiving contextual information of a communication instance involving another participant according to one embodiment presented herein.

In the following detailed description, references are made to the accompanying drawings that form a part hereof, and which are shown by way of illustration of specific embodiments or examples. Referring now to the drawings, in which like numerals represent like elements throughout the several figures, various technologies will be presented of providing a user involved in a communication instance with contextual information about another communication participant.

The following detailed description is directed to generally providing contextual information about a communication participant. The "communication participant," or merely "participant" is a party that is involved in some sort of present communication with the user. Communication involves at least two parties, and the perspective of the party that is using the service that receives contextual information is referred to as the "User." Reference herein to the "Party" (or "communication participant," or similar variations thereof in upper case) refers to the individual that the User is communicating with in context of the service. Reference to "party" (lower case) refers in general to a participant in a communication instance.

The contextual information may comprise various types of information, and may include records of prior communication instances between the User and the Party, as well as other types of information that may be relevant to the user or the Party in some way. The other types of information may include, for example, but is not limited to, documents authored or viewed by the Party that are stored on an enterprise server. Contextual information could also include information about other instances of information exchanged between the user and the other Party, as well as the information itself, which may be of a different type than the current type of communication between the User and the Party.

To briefly illustrate, a User may receive a telephone call from a business colleague. The User may find it helpful to view information about recent communications involving that colleague, which could include recently exchanged emails, voice messages, or documents. The User may find the information useful to determine a context for the current communication with the Party, particularly if the call pertains to the prior documents. Continuing with the example, the User and Party may engage in a telephone call to discuss a document previously exchanged via email between the two. Upon receiving a call from the Party, the User may find it beneficial to be presented, or easily locate, the document previously exchanged between the two. In this manner, the context for the communication may be quickly and easily established.

The communication instance between the User and the Party may be related to prior instances of communication. The communication instance can be of various forms, including, but not limited to: voice, video conferencing, email, instant messaging, or other forms. Although the principles of the concepts presented herein are presented using a limited number of communication forms, this should not be construed as limiting application of the principles herein to other communication forms.

The communication instance may involve only two parties (e.g., the User and the Party), but in other embodiments the communication instance may involve multiple Parties. Thus, the voice communication described above between the User and the Party could be a two-way telephone instance, or it could be a telephone conference call involving the User and multiple Parties. It is possible that other types of communication, such as email or video communication may involve the multiple Parties with the User.

Each type of communications may occur using various forms of technologies. For example, a voice call between two parties may involve the public switched telephone network ("PSTN") as well as wireless carriers (also referred to as cellular telephone providers). The voice call may involve voice-over IP ("VoIP") technology using other wireless or wired technologies.

The communication instances may involve various types of communication devices, such as smartphones, laptop computers, VoIP enabled phones, etc. Typically, the User will have a computing device that incorporates a display to present contextual information. This could also be the same device used to conduct the present communication instance. However, the User may still use separate devices, such as a laptop and voice telephone, where the contextual information is provided on a laptop and the present communication occurs using another device. Thus, there is no requirement that the communication device and computing device are one and the same. In one embodiment, the User will use a tablet computing device that incorporates a touch screen and speakerphone capability, which allows engaging in a voice conversation while simultaneously reviewing the display. Although the concepts are illustrated using a tablet computer, the concepts disclosed herein may be applied to a variety of other types of devices and should not be construed as being limited to only such devices.

One context for using the concepts disclosed herein is shown in the system illustration 100 of FIG. 1. In FIG. 1, the User could be using various types of computing devices for communicating with the other party. This includes using a smartphone 101, a laptop computer 102, or a tablet computing device 105. The provision of contextual information is not limited to using only these types of devices, as the concepts can be used by other types of computing devices, including desk top computers and other types of devices known to those skilled in the art.

The computing devices may utilize wireless connections 115, 117 for data transfer for interacting with other parties or servers located a cloud-based computing environment 106. The wireless data for the computing devices are conveyed in one embodiment by the Internet 104 to the cloud computer environment 106 and can be based on various readily available technologies, including various cellular based technologies (CDMA, GSM, 4G, EDGE, etc.) originating from cellular infrastructure 170 provided by a cellular service provider. Other wireless technologies (e.g., WiMax, WiFi, etc.) could be used. The wired technologies can be based on ISDN, cable modems, DSL, and other well-known technologies.

The connectivity afforded by the wired 103 and wireless 115, 117 communications through the Internet 104 provides the computing devices with access to servers 108 in the cloud computing environment 106. Other configurations are possible. Although the concepts illustrated herein may refer to a single server 108, there may be various servers involved. For example, one server 108 accessed by a device may in turn access another server 113. A plurality of servers may be used in another embodiment in order to provide the services disclosed herein.

The server 108 may execute various application programs 120. These may be executed in a shared or distributed manner across one or more servers with a client application executing in the computing devices 101, 102, or 105. The application programs 120 may include a drawing application 121 for creating and editing graphical oriented programs. Applications for editing images, video, etc. may also be considered with the scope of the drawing application. Other authoring applications 125 may also create and edit of forms of documents, such as text documents and spreadsheet documents.

Other applications executing on the server 108 may include social media applications 130 for group related messaging and communications. Another application program present may be an email/messaging application 135 that is involved in various messaging capabilities, including instant messaging. A communications application 140 may allow for video chat or voice communication. This application may interact with a client application providing the graphical user interface and contextual information to the User. A calendar application 145 may allow for organizing meetings and events. A contacts application 150 may allow for organizing contact information for the User and/or individuals associated with an enterprise. A streaming media application 155 may provide for streaming digital data, such as audio or video files. Each of these applications may store data, which server 108 may maintain in a data store 109 in the cloud computing environment 106, which can comprise various storage systems.

In one embodiment disclosed herein, the User is using a tablet computer 105 and engaged in voice communications with a Party. The other Party may be using a conventional telephone 114 connected to the PSTN 107, which in turn is connected to the Internet 104. In other embodiments, various other types of conventional voice equipment, such as a PBX or other forms of interworking equipment may be involved in the voice communication.

In one embodiment, the User of the tablet computer 105 may have received an incoming call from the other Party. The User may not readily know the other Party because calling party identification information may not be provided, or the User may not know the context of why the other Party originated the call. Typically, the person originating the call typically knows who they are calling and the context of why the call was originated. Thus, the context of the call is less likely to be known to the called party.

Figure 2:
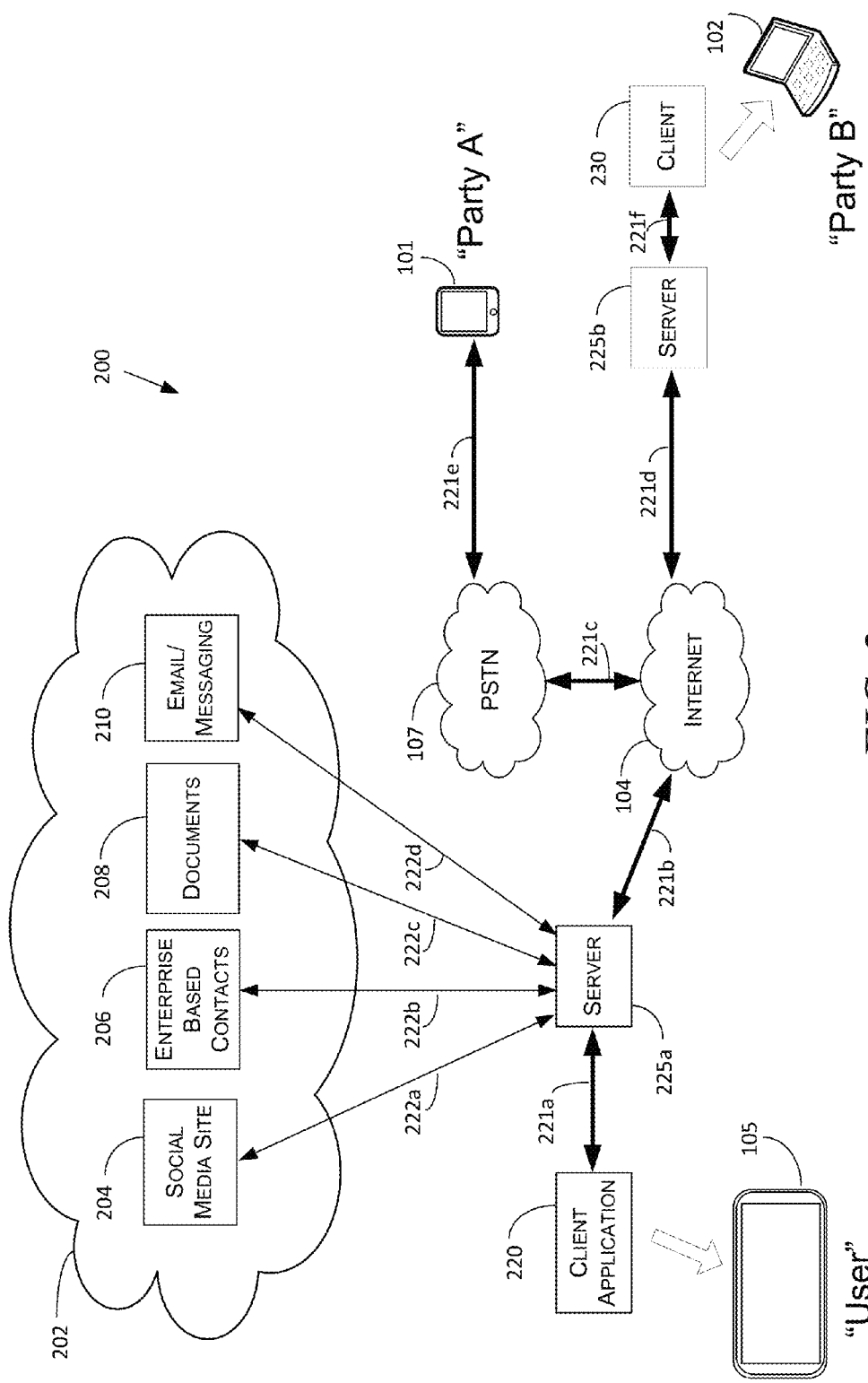
FIG. 2 is a schematic diagram of various applications which may interact with a server while providing the user with contextual information of a communication participant.

Turning to FIG. 2, a schematic diagram shows various application modules that may interact to provide contextual information to a User in association with another Party. For purposes of illustration, the tablet computing device 105 incorporates a client application 220. The User interacts with the client application 220 which in turn interacts with a server 225a that may provide for the various services disclosed herein. In various embodiments, the functionality allocated between the client 220 and the server 225a may vary, as is well known to those skilled in art.

For purposes of illustration, the User is presumed to be engaged in a voice conference involving Party A that is using smartphone 101 and Party B that is using laptop 102. The smartphone 101 is connected via a wireless carrier (not shown) to the PSTN 107. The PSTN 107 in turn may be connected to the Internet 104. The laptop 102 may also incorporate a version of the client application 230, and may communicate with another server 225b, which may be of the same type as server 225a.

The voice traffic itself, whether conventional TDMA or VoIP traffic is conveyed by the darker lines 221a-221f. Signaling information for controlling the voice calls may also be conveyed on these lines. The other lines 222a-222d convey data that typically is not voice information. Data may be also exchanged between the server 225a and the client application 220 using lines 221a. During operation of the conference call, the User at device 105 may interact with a graphical user interface provided by the client application 220 that interacts with the server 225a. The client application 220 may interact with the server 225a to provide access to various information sources, which are represented in the cloud 202. These information sources include, but are not limited to: a social media web site 204, an enterprise based contacts database 206, a document server 208, and an email messaging server 210. In other embodiments, these information sources may be located in the client application, or divided between the client application and server, or in other combinations. The information sources are shown as being in a cloud 202, since the exact implementation of these information sources can vary, and is typically not known to the user.

The social media site 204 may be any of the well-known web sites, including but not limited to Facebook®, LinkedIn®, Plaxo®, MySpace®, etc. In other embodiments, the information sources may include information providers that provide, e.g., white pages (directory information), real estate listings, court records, property tax records, etc. The information providers may charge for access, and/or may require an account to be established prior to obtaining the information for an indicated party.

The enterprise based contacts information source 206 may include a corporate directory database or contact database. In many embodiments the enterprise may maintain various information about its employees that are generally available to its employees to facilitate the business of the enterprise. The contacts database may include an employee's name, work location, title, position with the organization, education information, contact information, etc.

The document server 208 may also be an enterprise database of documents that are produced, reviewed, or edited by the employees in the enterprise. The document server may house various types of documents and/or data involving an employee in some way. Information therein may be indexed by documents that are authored, commented, edited, or otherwise viewed by an employee. Finally, the email messaging server 210 may also be an enterprise server that maintains records of information conveyed between employees. The email messaging server 210 may also be an email server providing individual email service to the User.

Although the illustrations provided herein are given in the context of an enterprise, the various information sources identified above are not required to be enterprise-level information sources (e.g., enterprise based web sites, databases, or information repositories). However, using the context of an enterprise provides a convenient illustration for depicting various applications of the contextual information service described herein. In other embodiments, access to information in the information source may be granted by the party on a limited or uncontrolled basis. For example, information placed in a social media website may be generally available for public access based on a permission level granted by the party creating the information.

At various times during a communication instance, the server 225a may access these various information sources 204, 206, 208, and 210 to obtain contextual information about a Party involved in a communication instance with the user. The server 225a may access one or more information sources when the communication is established between the User and the other Party, or the server may access the information sources in response to a User request.

For example, consider a two-party telephone call where a call originates from smartphone 101 by Party A and is delivered to the tablet computer 105 operated by the User. The incoming call may be provided with calling party number ("CgPN"), which is the telephone number associated with the calling party. The server 225a receives the CgPN and may access the contacts database 206 to determine the identity of the caller. If the caller is, for example, an employee of the enterprise, then the CgPN will likely be stored in the contacts database 206. The contacts database 206 can provide information such as the name, title, organization, and other such information to the server. The server 225a in turn, may provide this to the client application 220 when the call is initially established, or later at the request of the User. In this manner, the User receives contextual information about the call.

The server 225a may also search for contextual information related to prior communications involving Party A and the User. The server 225a could also retrieve recent documents authored by Party A from the enterprise document server 208. The server 225a may also ascertain an email address associated with the Party A and retrieve recent email messages exchanged between the User and Party A. This information can be retained in cache memory by the server in case the client 220 calls upon this information.

The server 225a may attempt to retrieve information about the caller from other sources. For example, if the CgPN is not found in the enterprise based contacts database 206, the server 225a may access other potential sources of information. For example, information based on the CgPN may be available from social media web sites, such as LinkedIn®, Facebook®, Plaxo®, a white pages database, or other information source. If the call originated from a non-PSTN source, such as in the case of Party B using a laptop 102, and there is no uniquely identifying CgPN provided, then the server 225a may use the IP address to ascertain a likely geographical area of origin.

The server 225a may also retrieve contextual information about the Party in the situation when the User originates a call. In this case, the server 225a receives the called party number ("CdPN") that can be used by the server 225a to retrieve information about the called party by accessing the same sources identified above. Again, this information can be cached in the server and provided to the client 220 upon request.

Although the above illustration is provided in terms of a voice call between the User and Party A (or Party B), the principles can be applied to other types of communication instances. For example, if the User receives an email from Party B, the server 225a may retrieve information based on the originating email address that identifies the sender, and retrieves phone call records, or phone call memos stored in the document server.

Figure 3:
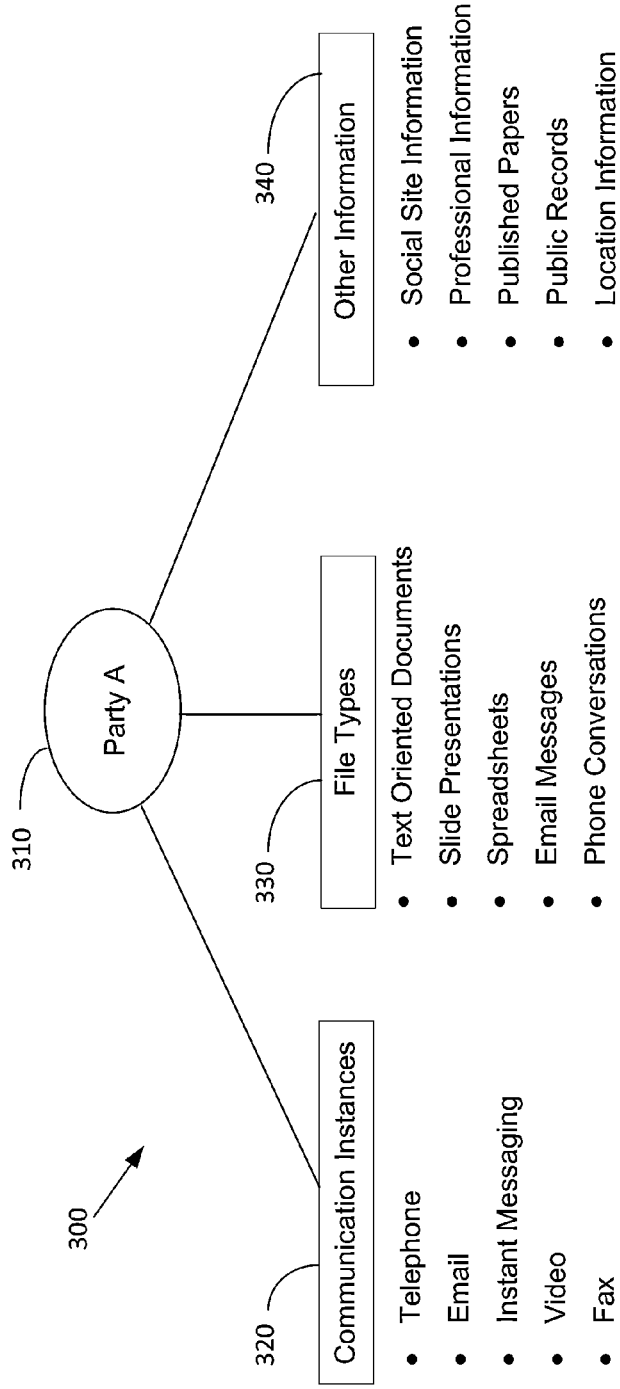
FIG. 3 is a schematic diagram illustrating general aspects of the service of providing contextual information related to the communication participant.

A more generalized description of the contextual information sources 300 and related capabilities can be provided using FIG. 3. FIG. 3 illustrates Party A 310, which represents a party in communication with the User. As noted, the communication could have been initiated by Party A 310 or the User. Furthermore, Party A 310 may be one of several other parties involved in a communication instance with the User. Party A may be associated with various potential sources of contextual information 300 that may be found in three broadly categorized sources.

Party A 310 may be associated with various prior communication instances 320 that involved the User. These instances may be of the types including: telephone calls, email messages, instant messages, video calls, and even faxes.

Party A 310 is also associated with several file types 330, which can represent various files that may be retained in an enterprise involving Party A. These files may include various text-based documents, such as memos, letters, or other forms of work-product that may be authored, reviewed, or commented by Party A. The files may also include graphics oriented documents, such as slides, photos, or videos. The files may also include spreadsheets, email messages, and records of phone conversations or call logs. Any type of searchable computer file could potentially be within the scope of this category.

Finally, Party A 310 may be associated with other types of information 340. This can include information that Party A has provided on social sites or professional sites, such as a site hosting published papers of Party A. It could include a site hosting public records, which may include information related to the general public, including Party A. This could include: tax records, justice records, property records, newspaper records, etc. The information may include data that the Party A has granted access to for certain parties, such as the User's location information based on location information collected by a wireless carrier.

Whenever there is a communication instance between the User and Party A, identifying information of Party A may be made available to the User, or derived from information provided. The information provided may include a telephone number, Internet address, user identifier, or even Party A's name. This information is used to ascertain the identity of Party A. For example, in many instances a telephone number is uniquely associated with Party A, so that receipt of the telephone number allows the name of Party A may be ascertained. In other instances, the identifying information may be an email address or a name included in the email message. Once the identity of Party A is ascertained, information of prior communication instances 320 involving the User, information of stored file types 330, and/or other information 340 involving Party A may be searched and cached. The information may be provided to the User during the call as requested.

The above contextual information may be screened by the server 225a, so only appropriate contextual information about the communication instance is presented to the User. Specifically, in one embodiment, only communication instances involving the User and Party are retrieved. This prevents the User from viewing, for example, email communications between Party A and another party, for which the User may not be authorized to view. The information from the File Types 330 may be obtained from an enterprise server that may incorporate privacy controls to limit the types of documents that may be searched in the context of the User.

For example, if the User is the supervisor of Party A, then the User may be allowed to see all the work-product of Party A. However, if the User is a subordinate to Party A, then the User may be allowed to only see a portion of the work-product of Party A, namely that work-product which Party A authorizes to be seen. On the other hand, any records or logs of phone conversations between the User and Party A may be freely accessible to the User as defined by the enterprise administrator.

Data received from the other information sources 340 may be screened as well. Party A may choose to make some information "private" or "restricted" as opposed to being "generally available." The site operator providing the other information 340 may also restrict provision of information based on whether the accessing entity has obtained the appropriate access level. For example, some sites will provide limited public record information without charge, but more detailed public record information may require the accessing entity to have an account with the information provider.

For a given instance of communication between the User and Party A, a variety of information, both public and enterprise-specific, may be available to the server 225a. Presenting the information to the User in an easy to use manner can be challenging. For example, the User may use a tablet computing device that may be limited to at any given time to viewing only one window controlled by one application. Further, the limited amount of screen space on the tablet could be easily overwhelmed by presenting all the different possible types of contextual information.

A well designed graphic user interface ("GUI") can allow the User to quickly and efficiently select the Party for whom the contextual information is to be provided for, and what type of contextual information is to be provided. One such GUI for accomplishing this is shown in FIG. 4.

Figure 4:
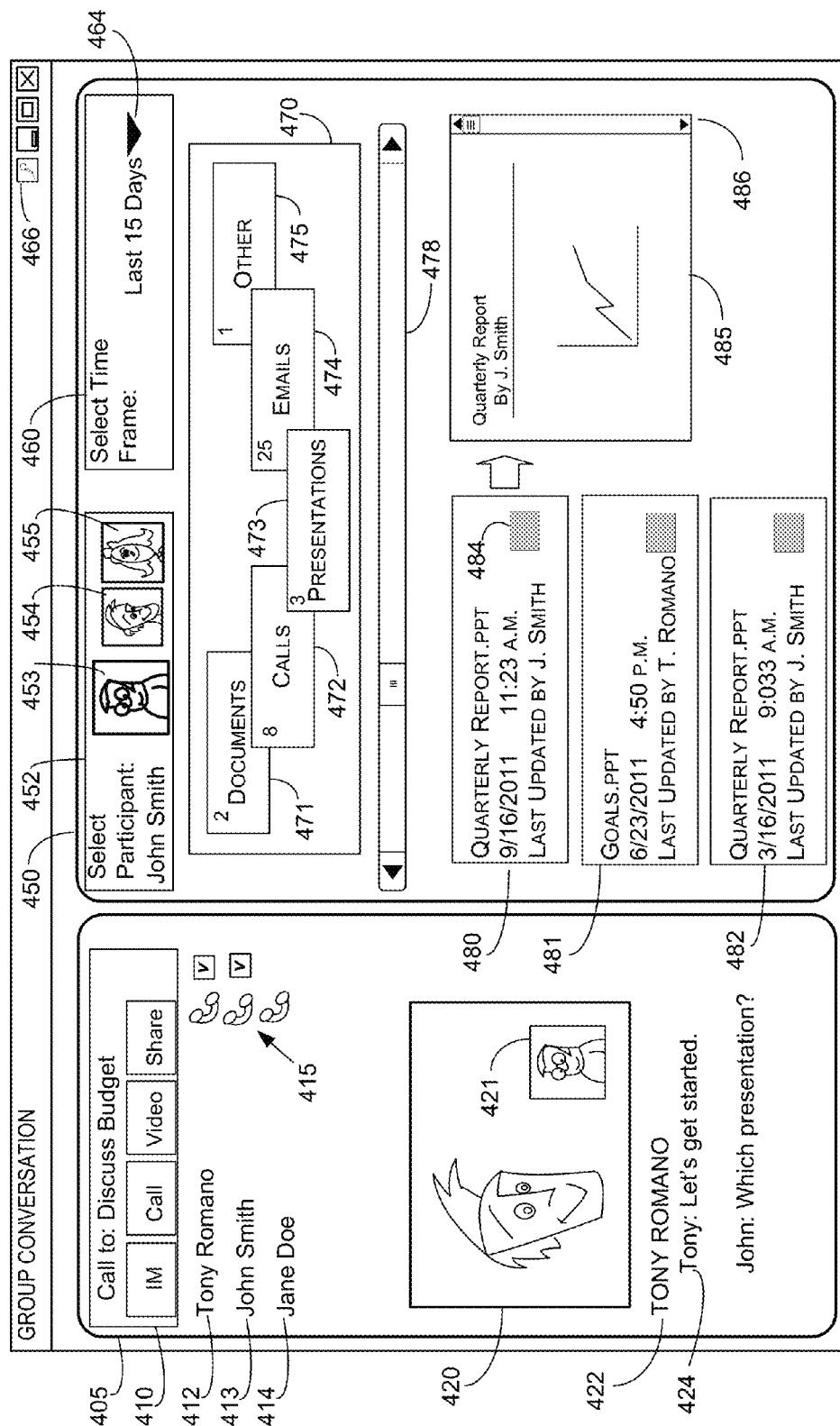
FIG. 4 is a user interface depicting one embodiment of providing the user with contextual information of the communication participant.

FIG. 4 illustrates a graphical user interface ("GUI") 400 that may be provided on a touch-screen tablet computer. Although described in terms of a touch screen, the principles can be applied to a conventional laptop or desktop computing device using a mouse or other type of pointing devices. The GUI 400 is divided up into two main sections, or panes. These are the communication control pane 405, shown on the left side of FIG. 4, and the contextual information pane ("CIP") 450 shown on the right side of FIG. 4.

The communication control pane 405 functions to control the particular instance of communication between the User and the other Parties. The communication control pane 405 comprises a control panel 410 that allows various communication commands to be issued, such as initiating an instant message, a telephone call, a video call, or share information with a party. Other icons 466 may allow the User to record the communication. Underneath the control panel 410, the names 412, 413, and 414 of current communication participants are indicated. In this embodiment, there is a 3-way conference call. A series of status icons 415 are shown, which indicate whether the communication is audio only (e.g., a telephone icon), or also includes video (indicated by the "v" icon). Thus, one party is conferenced by voice-only, whereas the others are video-conferenced. Other icons may be used to indicate status or other related information.

A video image pane 420 shows two video images, which are the two participants involved in the video conference. Underneath the video image pane 420, the name 422 of the participant (Party A) is indicated, with a running dialog of instant messaging 424 involving the participants. The User is also shown in a picture-in-picture format 421.

Turning now to the CIP 450, the CIP 450 provides the User with the ability to view and manage contextual information. First, the CIP 450 also allows the User to select the communication participant for whom contextual information is to be presented. Second, the CIP 450 allows the User to select the type of contextual information to be presented.

The selection of the communication participant (or Party) is accomplished by a participant selection pane 452. The participant selection pane provides images, such as thumbnail photos 453, 454, and 455 of the participants, which may include the User. The participant selection pane 452 allows the User to select the desired by Party by name or image. In this example, the selected participant 453 is illustrated by providing a name which results in the corresponding thumbnail image to be augmented. Once this is accomplished, any contextual information subsequently presented will be associated with the selected participant. The thumbnail images may come from various sources, and can be photographs, icons, drawings, or other representations of the Party.

The contextual information for the selected Party is indicated by using a time frame pane 460 and a contextual information type pane 470. For simplicity, the contextual information time frame may be simply referred to as the "date range" and the contextual information type is simply referred to as the "information type."

The date range is selected using a user control icon 464 and defines a certain window of time to be applied when searching for contextual information. Various user controls can be used, and FIG. 4 illustrates selection of one of a number of pre-defined options (the last 15 days). The pre-defined options could be defined for various time periods, such as 1 week, 2 weeks, 1 month, 3 months, 6 months, 1 year, etc.

The selection of contextual information also involves the contextual information type pane 470 and defines a particular file type to be searched. In this embodiment, a carousel-type user control ("carousel") is used to allow viewing and selection of the various options. In one embodiment, selection of one of the file types on the carousel is accomplished using a slide control 478. In other embodiments, the slide control may not be present and the User may use a finger on a touch screen to slide the carousel to select an information type. The carousel 470 displays a plurality of file types, which may include a "document" icon 471, a "calls" icon, 472, a "presentations" icon 473, an "emails" icon 474, and an "other" icon, 475. Other icons may be used in the carousel, including a "spreadsheet" icon (not shown). The carousel is one type of user control that allows ready selection of options, and allows a large number of options to be indicated without requiring a proportional amount of real-estate on the display.

The "documents" icon 471 may represent documents available on an enterprise server, such as memos or letters.

The "documents" icon 471 may also display within it another icon (not shown) representing the application used to create the documents. The number within the "documents" icon 471 ("2" in this example) indicates how many documents have been identified of this information type. Similarly, the "calls" icon 472 indicates that eight call records are identified, and so forth. The icon positioned in the center (presentations icon 473), is the currently selected information type. In one embodiment, the User may slide their finger along the icons to move the carousel position the desired icon in the center to represent the selected icon type. Other embodiments may have a fewer or greater number of information types, and different icon formats. Further, other types of user controls can be used in the GUI.

Once the time frame and contextual information type are selected by the User, the GUI 400 presents the contextual information comprising the search results. In this embodiment, the search results are provided in an area of the CIP 450 located below the slide 478. In FIG. 4, the search results comprise a listing of three files 480, 481, 482. Note that the number of files is the same as the number of files indicated in the selected "presentations" icon 473. If there were more files in the search results, then only a subset may be presented, dues to space limitations on the display.

The file names, along with selected file characteristics, are presented for the selected contextual information type. Specifically, in this embodiment, the three files 480, 481, and 482 are shown in chronological order. All three files are somehow related to the selected communication participant or Party, namely John Smith. These files may have been authored, edited, viewed, commented, or are somehow otherwise associated with John Smith in some way.

The contextual information comprising files 480, 481, 482 may also include an indicator 484 of the current status of the party. For example, the status indicator 484 may reflect that the person is presently involved in the current communication instance. The indicator could represent other aspects, such as a relevancy indicator of the particular search result.

If the User selected another information type icon using the carousel 470, such as the "emails" icon 474, the results would have reflected various emails. A chronological list of emails would be presented, which typical including the sender, recipient, subject line, and date. Similarly, if the "call" icon 472 were selected as the contextual information file type, the results may be a list of call dates and times involving the User and the selected participant. Those skilled in the art will appreciate that a number of formats may be used to present the contextual information, each being optimized in a format appropriate for the file type.

The User may opt to view a particular search result in further detail. A thumbnail image 485 of a selected search result is presented in greater detail as shown in FIG. 4. The thumbnail image 485 may be the first page of a presentation, as shown in FIG. 4. In other embodiments the thumbnail image may be the first page of the selected document, a complete email message, etc. The User may be able to further scroll through the pages of the contextual information using well known navigation icons 486.

The GUI 400 shown in FIG. 4 can be implemented in a variety of different ways using various user controls, and may vary based on the display size of the mobile device and whether a touch-screen or mouse is used. The ability of the GUI to allow the user to select a participant, and then view the various types of contextual information that are available, and then further select a particular type and instance of contextual information allows the User to quickly and easily obtain information relevant to the context of the instant communication. Those skilled in the art will recognize that other forms of user controls can be used, including speech recognition, other types of gesture inputs, etc.

Figure 5:
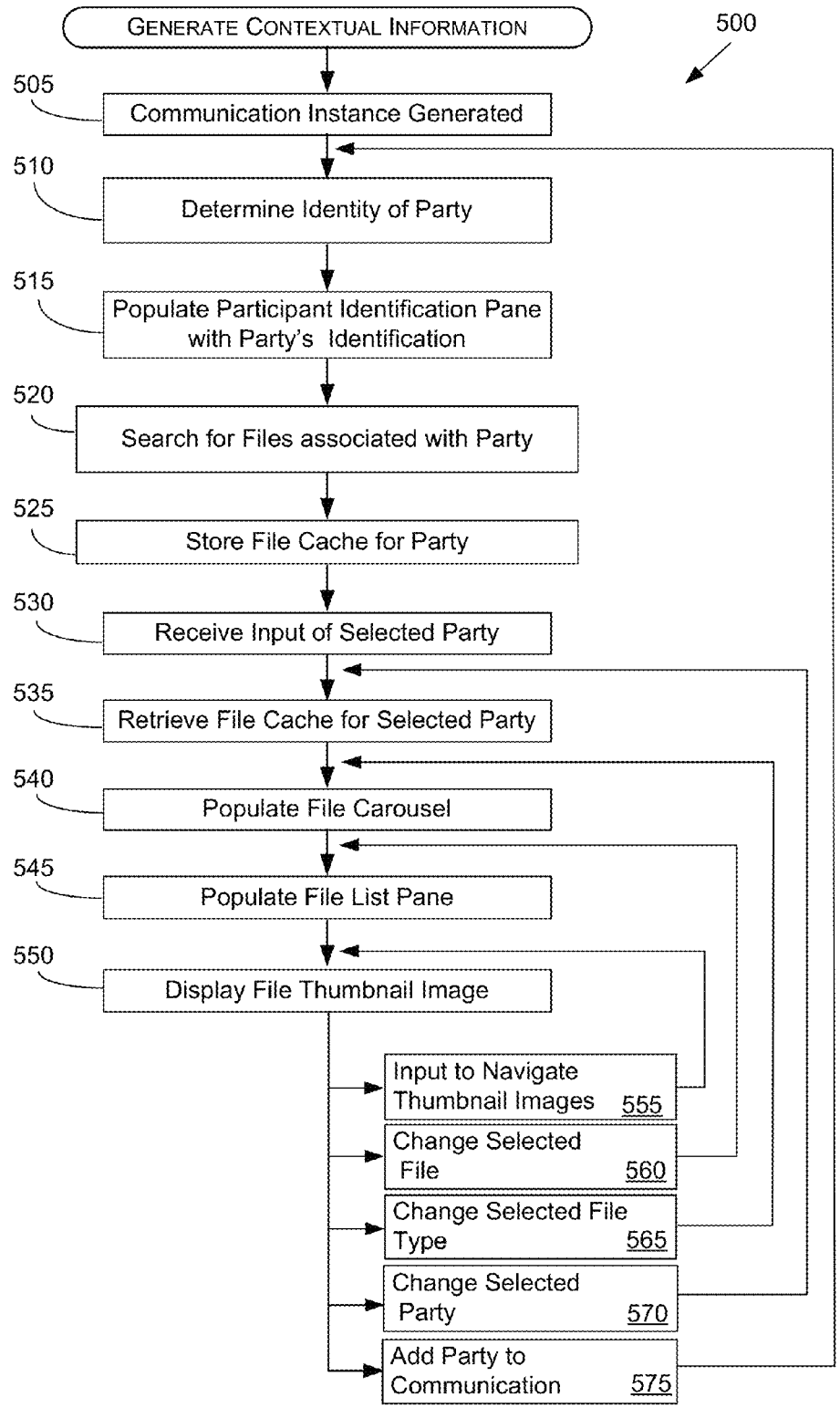
FIG. 5 is a process flow illustrating operations associated with providing contextual information to the user about the communication participant.

One embodiment of the processing in the server 225a for providing the contextual information is illustrated in FIG. 5. The process in FIG. 5 illustrates the various operations that may occur in order to present the selected contextual information for a user. It should be appreciated that the logical operations described herein with respect to FIG. 5 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 5 and described herein. These operations may also be performed in a different order than those described herein.

Turning to FIG. 5, the process 500 for generating contextual information is shown. The process begins with operation 505 where a communication instance is generated. This may be initiated by the User, or by another Party, e.g., a calling party. The communication may be of various forms, including voice, email, or other form. It may be adding an additional party to an existing call, for example.

In operation 510, the identity of the Party involved in the communication instance is determined. This may involve using an identifier associated with establishing the communication, such as an email address or a CgPN to ascertain the identity of the Party. In some embodiments, it may not be possible to ascertain the Party's identity, and the User may be prompted to enter this information. The GUI in FIG. 4 could be modified to allow the user to type in a name of the party, if it cannot be derived. When the concepts are applied to an enterprise environment, it can be expected that many of the communication instances may involve one colleague communicating with another, and the server will generally be able to identify the Party.

The concept of "federating" two enterprises allows enterprise data to be shared or made available between the two enterprises. This increase the likelihood that communication between individuals in different enterprises will allow ready identification of the Party. For example, enterprises that have a vendor-client relationship may agree to federate with each other, and therefore allow identifying information to be readily shared.

Once the identity of the Party is ascertained, in operation 515 the Party's name and/or image can be populated in the communication control pane 405 and in the participant selection pane 452. If an image icon is not available, a generic image outline can be provided. If the Party's name is not available, the User could be prompted to provide this information.

Once the Party's identity is determined, a search can be conducted for various types of files associated with the Party. The details of the processing at this step may vary in various embodiments. The scope of the search may be impacted by the time frame and the type of information context selected. However, the User may not have indicated either of these values at this point. In one embodiment, the search may be performed using the longest time frame and for all types of files using a defined list of information sources. The search results are cached in memory in operation 525 and not displayed until the User first selects that Party and defines the additional contextual information search parameters of time frame and information type. In other embodiments, the search may be initiated after the User selects a participant and the file type.

In operation 530, input is received from the user selecting a specific Party from the participant selection pane 452. A default value of the time frame 460 may be provided, and a default information type indicated by the carousel 470 may be used. In some embodiments, these values may be confirmed before subsequent processing operations occur.

Once the time frame and participant is determined, the carousel can be populated with the respective numbers of results that have been found in each category. In one embodiment, the search results 490 are not displayed until the user selects the particular information type from the carousel 470, even though the results may be stored in cache. In another embodiment, the current selected information type (which may be a default value) is used for immediately displaying the search results. In other words, a default information type (e.g., email) is used, as well as a default time frame value (e.g., 15 days) so that the last 15 days of emails involving the participant are automatically populated.

The contextual information results 490 are populated with the results in operation 545. In one embodiment, the results comprise a list of file names. Each file may comprise a document, email(s), or other search result. In one embodiment, the thumbnail image 485 is not populated until the User selects a particular contextual information result. In another embodiment, the thumbnail image 485 is automatically populated using the first displayed contextual information search result.

At this point, the User may provide various inputs to the GUI. The following lists various operations which are optional and that can occur in various order. In operation 555, the User may provide input to scroll of otherwise navigate among the thumbnail images 485. The user controls 486 for doing so may be based on conventional scrolling controls.

In operation 560, the User can provide input to change the selected file or contextual information search result. For example, FIG. 4 displays a thumbnail image 485 from the Quarterly Report 480 search result. The User may opt to view, instead, the search results associated with the Goals 481 search result.

In operation 565, the User may opt to select to change the type of contextual information. For example, the User may opt to view prior emails from the selected participant as opposed to presentations. This can be accomplished by the user interacting with the touch screen to roll the carousel 470 over to select the "emails" 474 icon. This would result in replacing the search results 490 with a list of emails involving the selected participant.

In operation 570, the User may opt to change the selected participant. Changing the selected participant may involve conducting a new search, or updating the icons in the carousel 470. Simultaneously, the contextual information in the search results portion 490 is removed or updated, as is any thumbnail image 485.

In operation 575, the User may choose to add another party to the communication. While this does not alter the displayed contextual information search results, it does update the participant selection pane 452 and allows the User to select that added Party as the selected participant.

The contextual information type carousel 470 may indicate various information types that are defined for a given enterprise environment. In other words, when colleagues from an enterprise communicate with each other, the server 225a may access a defined set of enterprise servers that contain documents, emails, presentations, contact information, etc. associated with the enterprise. The defined set of servers can be configured to provide consistency of contextual information for all enterprise users. When the User interacts with another Party that is outside of the enterprise, and which the enterprise servers may not have prior email records or other records of certain forms communications, there still may be "other" 475 contextual information types available for that Party.

Figure 6:
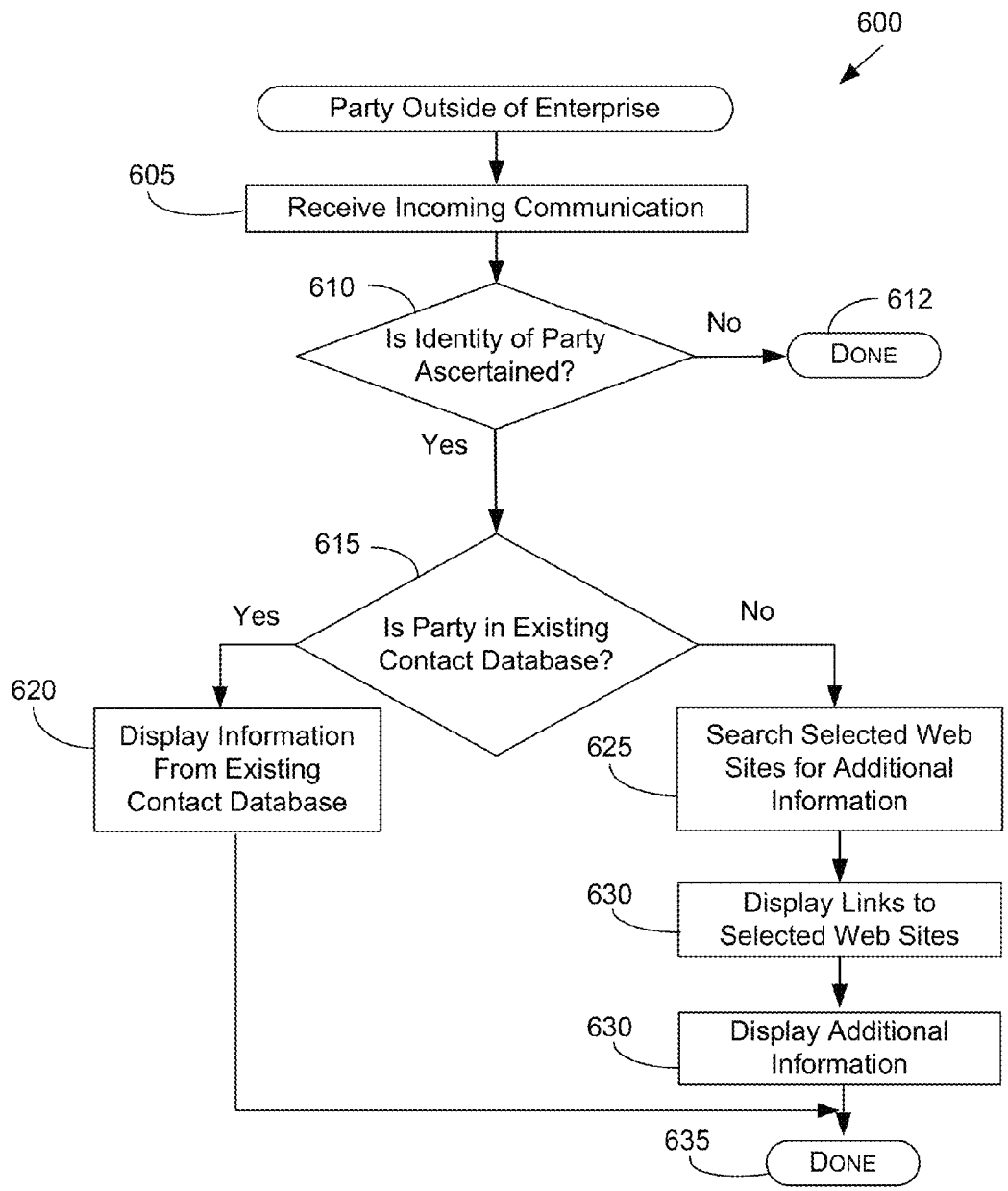
FIG. 6 is another process flow illustrating operations in providing another form of contextual information to the user about the communication participant.

In this case, when the server determines the Party does not have a presence in the defined set of enterprise information sources, i.e., the Party is outside of the enterprise, the processing flow may be that as shown in FIG. 6. The process 600 begins with receiving an incoming communication 605 from the non-enterprise affiliated Party. The communication may be an instant message, email, voice call, fax etc. The server 225a then determines in operation 610 whether the identity of the Party can be ascertained. In some instances, information may not be provided allowing the person to be identified. If this is the case, then processing completes in operation 612.

Assuming the identity of the Party is obtained, then in operation 615 the determination is made whether the identity is found in any of the enterprise based information sources reflecting that the Party is affiliated with the enterprise. If the determination is "yes," then in operation 620 the contextual information, such as described previously in FIG. 5 is displayed and the process completes in operation 635.

If, however, the identity of the Party is not found any enterprise databases, then attempts may be made to search other information sources for information about the party in operation 625. This may include providing the User in operation 630 with links to those information sources, without actually displaying the information contained therein. It is also possible to display the links along with additional contextual information in operation 630. The process then completes in operation 635.

As evident in light of the present disclosure, there may be voluminous information that can be provided from non-enterprise sources regarding a Party once the identity of the Party is established. A balance is desired between providing voluminous information which may be irrelevant and easily navigating various sources of information. The balance allows the User to quickly and efficiently determine the appropriate contextual information for a Party.

To accommodate this, in certain embodiments the User can configure which types of information are to be presented for different types of callers. For example, within an enterprise, a defined set of information sources may be consulted, and the set of information sources may depend on relative positions between the User and the Party. If the User is a supervisor of the other Party, more contextual information types may be provided, and unrestricted access may be provided to information files in those contextual information types. If, however, the User is a subordinate to the other Party, the User may be restricted in accessing the information. For example, the User may not be able to access the contextual information type "spreadsheets" authored by the other Party.

When the other Party is affiliated with the enterprise, the service may be configured to avoid searching certain information sources. The contextual information from the enterprise related information sources may be sufficient to provide an adequate context for the User. Identifying further contextual information from other information sources may be extraneous. When the other Party is outside the enterprise, then it may be more important to access certain other information sources and these other sources may further depend on the context.

For example, in one embodiment a User in a work environment may find it beneficial to access certain types of professional-oriented information sources for providing contextual information for a non-enterprise affiliated Party. However, the same user in a personal or residential setting may define other social-oriented information sources for providing contextual information. For example, a User that is a sale representative may wish to have contextual information about the Party's work company provided when receiving calls at work. The same User at home may wish to have other types of contextual information provided when receiving calls at home (such as social oriented contextual information). The User may be able to configure which information sources are consulted for different environments based on various factors, including the user's current geographical location, time, etc.

Figure 7:
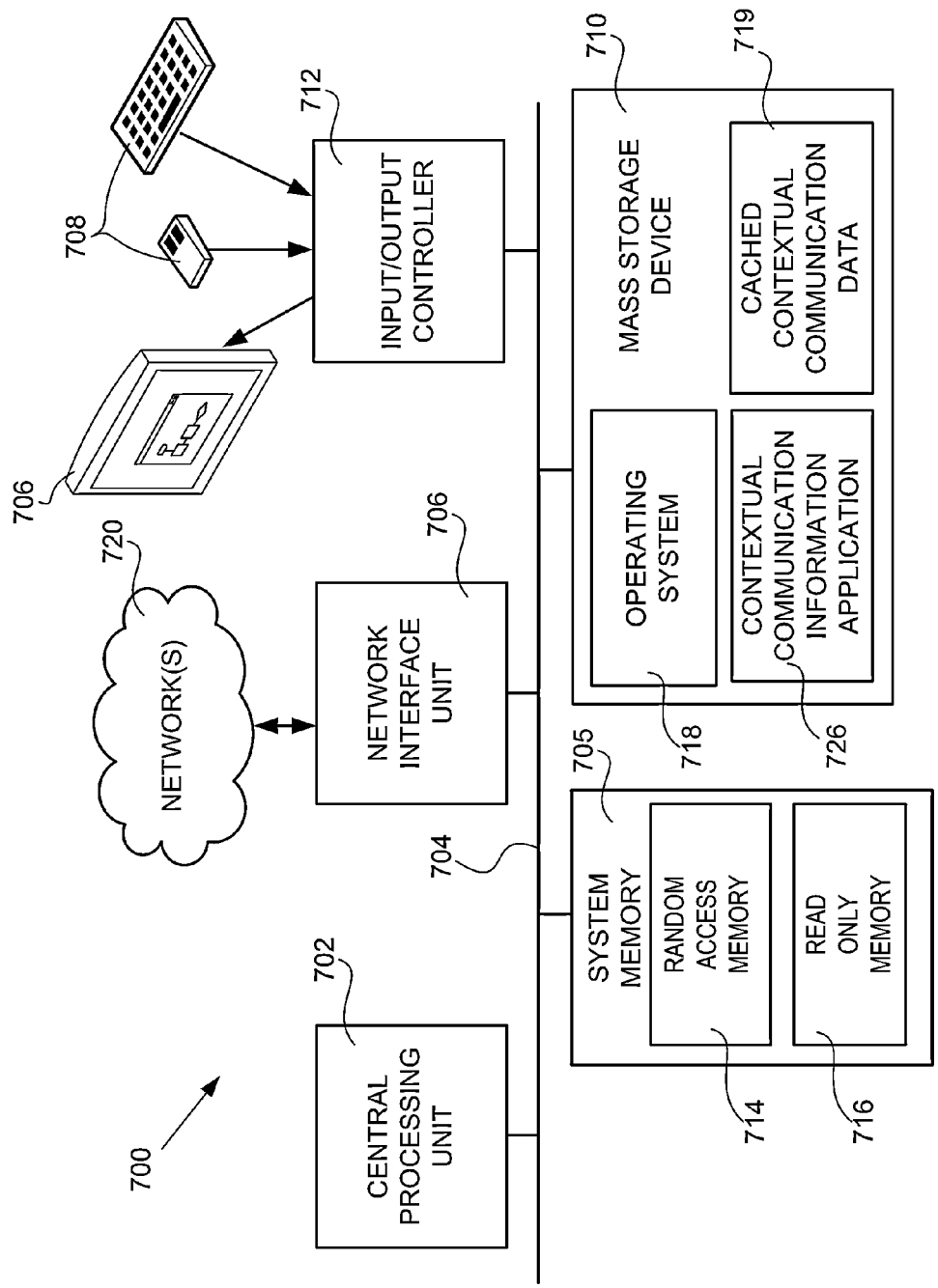
FIG. 7 illustrates a computer architecture of a computing device configured to provide contextual information about the communication participant.

The process flow described above and other related functions can be implemented in one embodiment by the computing architecture of a computer device 700 as shown in FIG. 7. FIG. 7 shows an illustrative computing architecture for a computing device capable of executing the processes described. Although FIG. 7 describes the computing device such as a smartphone 101, laptop 102, or tablet computer 105, the architecture shown in FIG. 7 may illustrate a conventional server computer, desktop computer, or other type of computer utilized to execute any aspect of the software components presented herein. Other architectures or computers may be used to execute the software components presented herein.

The computer architecture shown in FIG. 7 includes a processor 702 (a.k.a. as a centralized processing unit or "CPU"), a system memory 705, including a random access memory 714 ("RAM") and a read-only memory ("ROM") 716, and a system bus 712 that couples the memory to the CPU 702. A basic input/output system containing the basic routines that help to transfer information between elements within the computing device 700, such as during startup, is stored in the ROM 716. The computing device 700 further includes a mass storage device 710 for storing an operating system 718, application programs, and other program modules, as described herein.

The mass storage device 710 is connected to the CPU 702 through a mass storage controller (not shown), which in turn is connected to the bus 712. The mass storage device 710 and its associated computer-readable media provide non-volatile storage for the computing device 700. Although the description of computer-readable media contained herein refers to a mass storage device, such as a hard disk or CD-ROM drive, it should be appreciated by those skilled in the art that computer-readable media can be any available computer storage media that can be accessed by the computing device 700.

It should be appreciated by those skilled in the art that computer-readable media may be any available media that can be accessed by the computing device 700, including computer-readable storage media and communications media. Communications media includes transitory signals. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 700. However, the computer readable media does not encompass transitory signals.

According to various embodiments, the computing device 700 may operate in a networked environment using logical connections to remote computers or servers through a network (not shown in FIG. 7). The computing device 700 may connect to the network 720 using an antenna (not shown). In other embodiments, connection to other types of networks may be accomplished using an input/output controller 712. The input/output controller 712 can be used for receiving and processing input from a number of other devices 708, including a keyboard, mouse, or electronic stylus (not shown in FIG. 7). Similarly, an input/output controller 712 may provide output to a display screen 706, a printer, or other type of output device (also not shown in FIG. 7). In one embodiment, the computing device may incorporate a display screen 706 comprising a touch screen display. The touch screen display functions to not only display information, but also to receive input from the user, including inputting text, commands, and controls.

As mentioned briefly above, a number of program modules and data files may be stored in the mass storage device 710 and RAM 714 of the computing device 700, including an operating system 718 suitable for controlling the operation of a networked desktop, laptop, tablet or server computer. The mass storage device 710 and RAM 714 may also store one or more program modules or data files. In particular, the mass storage device 710 and the RAM 714 may store the contextual communication information application 726. The mass storage device 710 and RAM 714 may also store cached contextual information 719 that communicates with the communication information application 726. This cached contextual information may be called as needed, or may be integrated into the communication information application.

It should be appreciated that the software components described herein may, when loaded into the processor 702 and executed, transform the processor 702 and the overall computing device 700 from a general-purpose computing system into a special-purpose computing system customized to facilitate the functionality presented herein. The processor 702 may be constructed from any number of transistors or other discrete circuit elements, which may individually or collectively assume any number of states. More specifically, the processor 702 may operate as a finite-state machine, in response to executable instructions contained within the software modules disclosed herein. These computer-executable instructions may transform the processor 702 by specifying how the processor 702 transitions between states, thereby transforming the transistors or other discrete hardware elements constituting the processor 702.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 700 in order to store and execute the software components presented herein. It also should be appreciated that the computing device 700 may comprise other types of computing devices, including hand-held computers, embedded computer systems, personal digital assistants, and other types of computing devices known to those skilled in the art. It is also contemplated that the computing device 700 may not include all of the components shown in FIG. 7, may include other components that are not explicitly shown in FIG. 7, or may utilize an architecture completely different than that shown in FIG. 7.

Based on the foregoing, it should be appreciated that a user involved with communication with a party can quickly and easily request contextual information that may be related to the communication. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A computer implemented method for providing contextual information for a communication instance comprising:
identifying the communication instance of a first type by a server between a user computing device executing a client application and at least one remote communication device associated with a communication participant, whereby information is conveyed between the client application and the server by way of the communication instance, and whereby the communication instance is based on an Internet protocol;
determining by the server an identity of the communication participant with whom the remote communication device is associated by using a communication identifier associated with the communication instance;
determining by the server a name of the communication participant using the communication identifier;
accessing, by the server, a plurality of contextual information sources to identify contextual information associated with the communication participant, wherein each of the plurality of contextual information sources store contextual information by contextual information type;
determining by the server that the identified contextual information is of at least two differing contextual information types, each of the at least two differing contextual information types describing at least one file associated with the communication participant and stored on the plurality of contextual information sources, the plurality of contextual information sources being separate from the remote communication device;
providing by the server to the client application the name of the communication participant and data identifying the at least two differing contextual information types;
receiving a request at the server from the client application selecting one of the at least two differing contextual information types, wherein the request is associated with the identity of the communication participant; and
providing, by the server to the client application, search results comprising a subset of the identified contextual information associated with the identity of the communication participant, wherein the subset of the identified contextual information comprises at least one file name of the at least one file associated with the selected differing contextual information type.

2. The computer implemented method of claim 1, wherein the communication instance includes a plurality of communication participants, and wherein the computer implemented method further comprises providing a graphical user interface providing an image of the communication participant and a respective icon associated with the at least two differing contextual information types.

3. The computer implemented method of claim 2, further comprising receiving a selection at the server selecting the communication participant from the plurality of communication participants.

4. The computer implemented method of claim 1, wherein the contextual information comprises a file name of a document authored by the communication participant or information about prior email communication instances between the communication participant and a user of the user computing device.

5. The computer implemented method of claim 4, further comprising providing by the server to the client application an indication of a number of the search results associated with the selected differing contextual information type.

6. The computer implemented method of claim 2, further comprising receiving in the request the identity of the communication participant.

7. The computer implemented method of claim 1, wherein determining the name of the communication participant using the communication identifier comprises querying an enterprise server using a telephone number of the communication participant.

8. The computer implemented method of claim 7, further comprising initiating a query by the server to an email server for a file comprising prior email communication between the communication participant and a user of the user computing device.

9. The computer implemented method of claim 8, wherein data identifying a time frame is received by the server from the client application and used to limit the query to the email server for the prior email communication.

10. A server for providing contextual information comprising:

a communication interface for conveying an Internet Protocol ("IP") based communication instance of a first type between a client application executing in a user computing device and a remote communication device associated with a communication participant;

a memory for storing a name of the communication participant and contextual information associated with the communication participant; and a processor configured to
identify the IP-based communication instance,
determine the name associated with the communication participant using a communication instance identifier associated with the communication participant,
access a plurality of contextual information sources to identify contextual information associated with the communication participant, wherein each of the plurality of contextual information sources store contextual information by contextual information type,
determine that the identified contextual information is of at least two differing contextual information types, each of the at least two differing contextual information types associated with at least one file associated with the communication participant and stored on the plurality of contextual information sources, the plurality of contextual information sources separate from the remote communication device,
receive a request from the client application indicating a selected contextual information type, wherein the selected contextual information type is selected from the at least two differing contextual information types, and wherein the request is associated with the name of the communication participant,
provide by the server to the client application, one or more names of contextual information files having the selected contextual information type, and
provide by the server to the client application a thumbnail image of a selected one of the one or more names of the contextual information files having the selected contextual information type.

11. The server of claim 10 wherein the processor is further configured to:
query an enterprise server using the communication instance to determine the name and receive an image of the communication participant;
provide the name and the image to the client application; and
receive a selection that selects the communication participant prior to providing one or more contextual information file names.

12. The server of claim 11 wherein the processor is further configured to initiate a query to the plurality of contextual information sources, the plurality of contextual information sources being defined in a list for the client application as contextual information file sources.

13. The server of claim 11 wherein the processor is further configured to receive a selection indicating one of the one or more contextual information file names prior to providing the thumbnail image to the client application.

14. The server of claim 10 wherein the processor is further configured to:
receive a second request from the client application indicating a different selected contextual information type, wherein the different selected contextual information type is one of the at least two differing contextual information types; and provide second one or more names of contextual information files having the different selected contextual information type to the client application.

15. The server of claim 14 wherein the processor is further configured to:
receive an indication at the server of a second name of a second communication participant associated with the IP-based communication instance, wherein the second request from the client application is associated with the second name of the second communication participant; and
wherein providing the second one or more names of contextual information files having the different selected contextual information type to the client application is further based on the second name of the second communication participant.

16. A computer-readable medium comprising one or more of an optical disk, a solid state memory device, or a magnetic storage device and storing instructions thereon that when executed cause a processor to:
establish a communication instance between a user computing device executing a client application and at least one remote communication device associated with a communication participant;
determine a name of the communication participant associated with the communication instance based on a communication identifier associated with the communication participant involved in the communication instance;
access a plurality of contextual information sources to identify contextual information associated with the communication participant, wherein each of the plurality of contextual information sources store contextual information by contextual information type;
determine that the identified contextual information is of at least two differing contextual information file types, each of the at least two differing contextual information file types associated with at least one file further associated with the communication participant and stored on the plurality of contextual information sources, the plurality of contextual information sources being separate from the remote communication device;
provide the at least two differing contextual information file types to the client application;
receive a request from the client application indicating a selected contextual information file type, wherein the selected contextual information file type is selected from the at least two differing contextual information file types, and wherein the request is further associated with the communication participant;
provide one or more names of contextual information files of the selected contextual information file type to the client application; and
provide a thumbnail image of a selected one of the one or more names of the contextual information files having the selected contextual information file type to the client application.

17. The computer-readable medium of claim 16, comprising further instructions that cause the processor to:
receive a second request from the client application indicating a different selected contextual information file type, wherein the different selected contextual information file type is one of the at least two differing contextual information file types; and
provide second one or more names of contextual information files having the different selected contextual information file type to the client application.

18. The computer-readable medium of claim 16, comprising further instructions that cause the processor to:
   receive an indication from the client application of a second name of a second communication participant associated with the communication instance, wherein the indication from the client application is associated with the second communication participant; and
   provide second one or more names of contextual information files associated with a different selected contextual information file type to the client application.

19. The computer-readable medium of claim 16, comprising further instructions that cause the processor to receive a selection indicating the selected one of the one or more contextual information files prior to providing the thumbnail image to the client application.

20. The computer-readable medium of claim 16, comprising further instructions that cause the processor to initiate a query to the plurality of contextual information sources defined in a list of contextual information sources for the client application.

* * * * *